United States Patent [19]

Innes

[11] 3,944,844

[45] Mar. 16, 1976

[54] FLOAT OPERATED ELECTRICAL SWITCH ASSEMBLY

[75] Inventor: Robert Innes, Beaconsfield, England

[73] Assignee: Ronald Trist Controls Limited, England

[22] Filed: July 30, 1974

[21] Appl. No.: 493,089

Related U.S. Application Data

[63] Continuation of Ser. No. 365,627, May 31, 1973, abandoned.

[30] Foreign Application Priority Data

June 12, 1972 United Kingdom............... 27299/72

[52] U.S. Cl.................. 307/116; 200/84 C; 73/305
[51] Int. Cl.².......................................... G01F 3/06
[58] Field of Search ..... 307/116; 200/84 C; 73/305, 73/DIG. 5, 313; 317/DIG. 3

[56] References Cited
UNITED STATES PATENTS 3,293,579  12/1966  Harper.............................. 200/84 C Primary Examiner—Herman J. Hohauser
Attorney, Agent, or Firm—Brisebois & Kruger

[57] ABSTRACT

The invention is concerned with a float-operated electrical switch assembly comprising a vertical tubular housing, at least the lower end of which is arranged to be open to a liquid the level of which is to be monitored. A float is restrained to move vertically in the housing with changes in the liquid level and a magnet mounted on the float cooperates with a magnetically responsive switch actuator which is contained in a tubular casing of non-magnetic material extending into the housing from the side of the housing. The switch assembly is primarily intended for a low level alarm.

4 Claims, 4 Drawing Figures

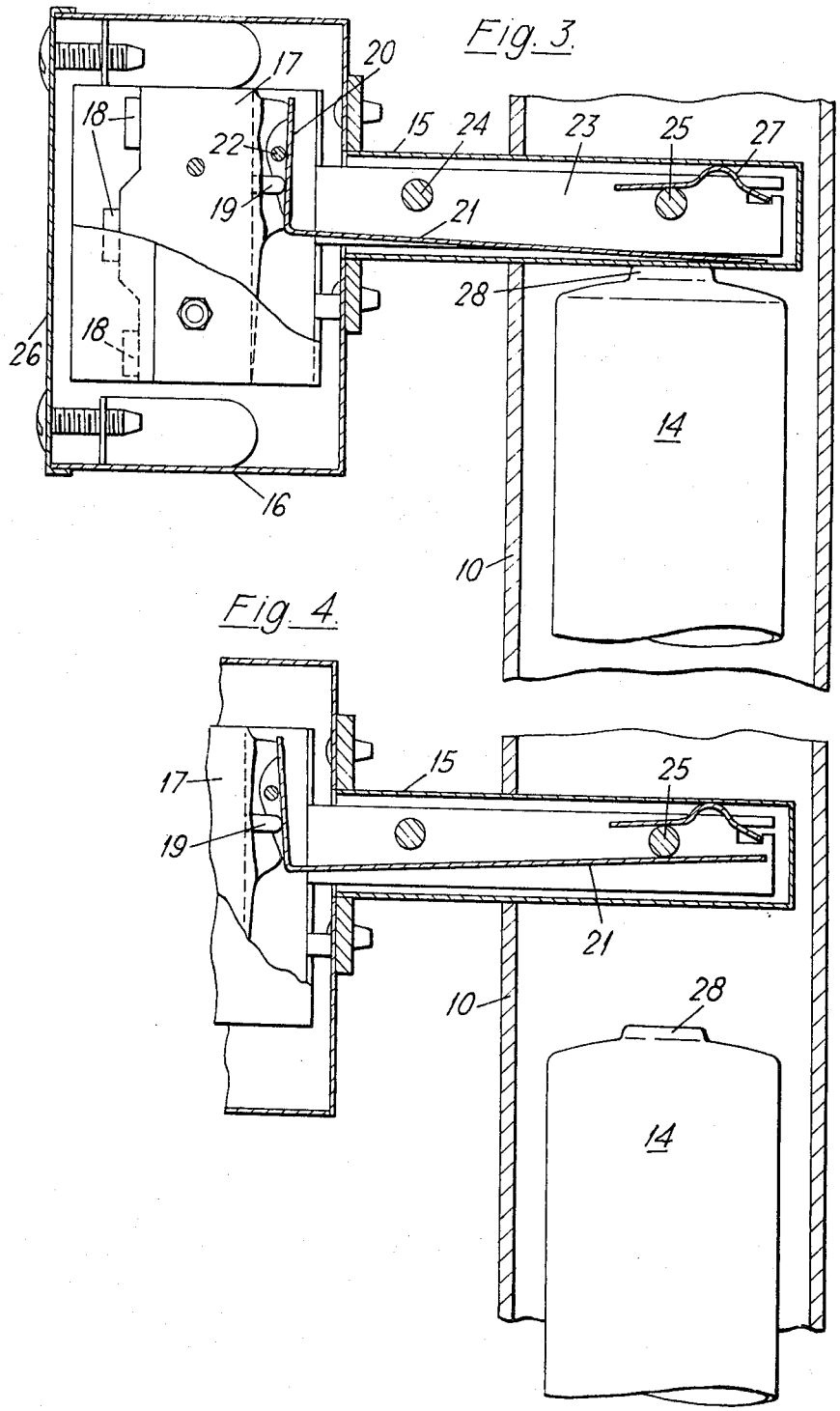

FLOAT OPERATED ELECTRICAL SWITCH ASSEMBLY

This is a continuation of application Ser. No. 365,627, filed May 31, 1973, now abandoned.

The invention is concerned with a float-operated electrical switch assembly, for use with a boiler or other liquid container. The assembly has a float which follows the movement of the liquid level and a magnet which is connected to and moves with the float, the magnet operating magnetically responsive switch contacts through a non-magnetic wall.

In conventional structures of such a switch the float and magnet are pivotally mounted and this means that a large horizontal length is necessary in the container to form the mounting of the assembly.

According to the invention a float operated electrical switch assembly comprises a vertical tubular housing, at least the lower end of which is arranged to be open to a liquid the level of which is to be monitored, a float which is restrained to move vertically in the housing with changes in the liquid level, and a magnet mounted on the float and cooperating with a magnetically responsive switch actuator which is contained in a tubular casing of non-magnetic material extending into the housing from the side of the housing.

The provision of the non-magnetic wall through which the float magnet influences the switch actuator, in the form of a tubular casing extending into the housing from a side wall of the housing, enables the non-magnetic wall to be comparatively thin so that the magnet may operate very close to the switch actuator with great sensitivity.

The construction is extremely compact and although the housing may be arranged inside the container holding the liquid, the level of which is to be measured, the housing is preferably connected at its upper and lower ends to the side of the liquid container, or to a feed pipe from an upper liquid reservoir tank to a liquid container such as a boiler.

The switch assembly is particularly applicable for use in a low level alarm system. In that case the switch actuator may be magnetically attracted and held in a first position by the float magnet when the float is in a normal raised position but when the float drops upon the liquid level reaching the lower level, the switch actuator is freed from the magnetic attraction and moves to a second position.

One example of a switch assembly constructed in accordance with the present invention is illustrated in the accompanying drawings, in which:

FIG. 3 is a section taken on the line III—III in FIG. 2 showing the float in a raised position; and, FIG. 4 is a section similar to FIG. 3 but showing the float in a low level position.

Figure 1:
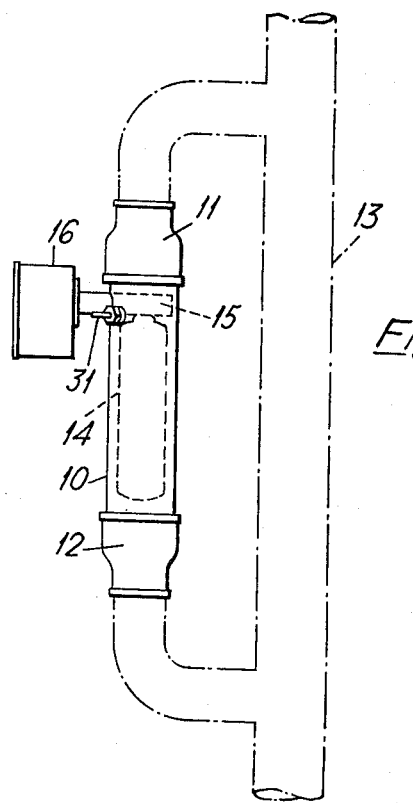
FIG. 1 is a side elevation.

The illustrated assembly has a tubular steel housing 10 with upper and lower screw threaded couplings 11 and 12. As shown in FIG. 1 these couplings are connected via elbows to a water feed pipe 13 from an upper reservoir tank to a boiler at a lower level. When the pipe 13 is full of water, a float 14 which is constrained to move vertically in the housing 10 rises under its buoyancy into engagement with a stainless steel non-magnetic tubular casing 15 which extends into the housing 10 through a seal in its wall and is connected at its outer end to a switch contact housing 16. Mounted in the housing 16 and casing 15 is a subassembly comprising a two-way microswitch 17 having terminals 18 which will be connected externally by means of insulated conductors extending into the housing 16 through an appropriate aperture. The microswitch 17 has a switch contact changeover operating plunger 19 which is depressed against spring action by means of one arm 20 of an angular ferromagnetic switch actuator the other arm 21 of which extends along inside the casing 15. The switch actuator is pivotally mounted on the microswitch 17 about an axis 22. The microswitch itself is mounted by means of two parallel plates 23 which are rigidly fixed to the microswitch and extend as a push fit in the casing 15. The two plates 23 are interconnected by bars 24 and 25 and the arm 21 of the switch actuator works between the plates. During assembly the plates 23, switch actuator, and microswitch are offered into the housing 16 after its cover 26 has been removed, and the plates 23 are pushed into the casing 15. In the assembled position the lower leading corners of the plates 23 abut against the bottom of the casing 15 and are held in that position by means of a leaf spring 27 which is mounted on the plates 23 and abuts against the top of the casing 15.

When the float 14 is in its normal raised position, shown in FIG. 3, a magnet 28 fixed in the top of the float, draws the arm 21 of the switch actuator down to the lower position shown in FIG. 3 causing the arm 20 to depress the plunger 19 so that the switch contacts and the microswitch adopt a first configuration. In the event of the liquid level in the housing 10 dropping, the float will fall as well until the magnetic attraction between the magnet 28 and the arm 21 of the switch actuator is insufficient to overcome the return spring of the plunger 19 of the microswitch, whereupon the switch actuator pivots with a snap action to its other end position shown in FIG. 4 in which the arm 21 is raised abutting against the bar 25. The plunger 19 is thus free to move outwards under its spring action causing the switch contacts in the microswitch to adopt their second configuration. In this second configuration the switch contacts can operate a low level alarm indicating that the liquid level has dropped to a dangerous value. When the assembly is connected as in the FIG. 1 example, a dropping in the liquid level sufficient to allow the float 14 to fall to the FIG. 4 position, could occur upon the upper reservoir tank running dry and the liquid level falling down the pipe 13 towards the boiler.

When the liquid level in the housing 10 rises again, the float 14 will rise again to the FIG. 3 position whereupon the magnetic attraction between the magnet 28 and the arm 21 will cause the magnet to capture the arm, swinging the switch actuator back to the FIG. 3 position again.

Figure 2:
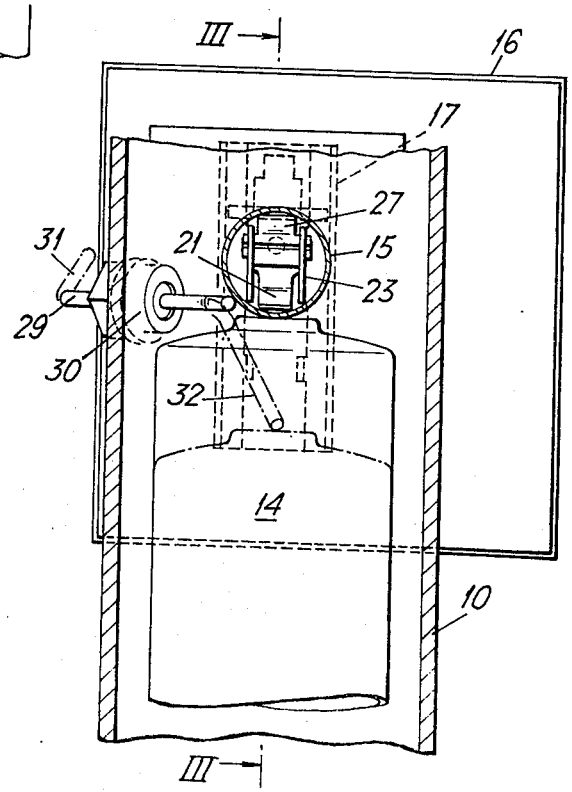
FIG. 2 is a vertical section through the assembly in the plane perpendicular to the plane of the paper and as seen from the right in FIG. 1.

In order to enable the float 14 to be forced downwards in the liquid in the housing 10, to simulate low level condition, a test actuator is provided. This consists of a bent wire 29 which extends through a gland seal 30 in the wall of the housing 10. The outer end of the wire 29 is bent to form an actuating handle 31 and the inner end is bent to form an arm 32 which engages the top of the float 14. Normally the test actuator does not interfere with the operation of the float but when a test is to be conducted the wire 29 is rotated by turning the handle 31 whereupon the arm 32 forces the float downwards to the dotted line position shown in FIG. 2. The switch actuator then adopts the FIG. 4 position until the test actuator is released allowing the float to rise to the full line position in FIG. 2 again.

Similarly it would be appropriate for the assembly to be fitted via elbows to the side of a liquid container such as a boiler, rather than in a feed pipe to such a container.

I claim:

1. In a float-operated electrical switch assembly for indicating the liquid level in a liquid containing system having a sidewall, said switch assembly comprising a tubular float housing, a float restrained to move in said float housing with changes in the level of a liquid therein, and a magnet mounted on said float, the improvement which comprises a tubular casing of non-magnetic material extending into said float housing transversely of said float housing, and having a portion projecting transversely outwardly from said float housing, the interior of said tubular casing being sealed from the interior of said float housing, duct means attached to said float housing and adapted to be fastened to said sidewall and to permit liquid to flow between said system and said float housing through said duct means while maintaining said float chamber in a vertical position, a switch unit housing containing an electrical switch unit, and connected to said projecting portion of said non-magnetic casing externally of said float housing, said switch unit housing having an opening in the side thereof remote from said non-magnetic casing, a removable cover for said opening, and a magnetically responsive switch actuator extending from said switch unit into a region within both said non-magnetic casing and said float housing for actuation by said magnet, said actuator and electrical switch unit being dimensioned to be removable through said opening when said cover is removed.

2. An assembly according to claim 1, for use in indicating when a lower liquid level is reached, wherein said switch actuator is positioned to be magnetically attracted and held in a first position by said float magnet when said float is in a normal raised position and to be freed from said magnetic attraction and move to a second position when said float drops upon said liquid level reaching said lower level.

3. An assembly according to claim 1, wherein said switch actuator is a lever pivoted about a horizontal axis transverse to the axis of said tubular casing so that an end of said lever which cooperates magnetically with said float magnet is lowered in said first position of said switch actuator and raised in said second position of said switch actuator.

4. An assembly according to claim 1 in which said duct means comprises two individual ducts, one attached to the upper end of said float housing and the other to the lower end of said float housing, both of said individual ducts being adapted to be fastened to said sidewall.

* * * * *